United States Patent [19]
Yuta

[11] Patent Number: 5,944,467
[45] Date of Patent: *Aug. 31, 1999

[54] PRESS NUT

[75] Inventor: Kiyoteru Yuta, Toyohashi, Japan

[73] Assignee: Emhart Inc., Newark, Del.

[ * ] Notice: This patent is subject to a terminal disclaimer.

[21] Appl. No.: 09/104,139

[22] Filed: Jun. 24, 1998

[30] Foreign Application Priority Data

Jun. 24, 1997 [JP] Japan .................................... 9-166761

[51] Int. Cl.⁶ ............................. F16B 13/06; F16B 37/08
[52] U.S. Cl. ......................... 411/433; 411/57.1; 411/270; 411/432
[58] Field of Search .................................... 411/267, 270, 411/433, 432, 57.1

[56] References Cited

U.S. PATENT DOCUMENTS

| | | | |
|---|---|---|---|
| 5,340,252 | 8/1994 | Weddendorf | 411/433 X |
| 5,427,488 | 6/1995 | Fullerton et al. | 411/433 |
| 5,468,105 | 11/1995 | Iwamoto | 411/433 |
| 5,613,816 | 3/1997 | Cabahug | 411/433 |

Primary Examiner—Neill Wilson
Attorney, Agent, or Firm—Edward D. Murphy

[57] ABSTRACT

To provide a press nut being capable of easily attaching and detaching the nut to and from a bolt by linearly pressing the nut along the bolt and by linearly drawing the nut along the bolt a press nut 1 has a nut body 2 of plastic, tubular cap 3 of plastic to receive the nut body thereinto to connect the nut body thereto, and a cover 6 to axially move the nut body in relative to the cap. The nut body 2 comprises a base 13, two threaded portions 15 having threaded inner walls to form a nut as a whole, and spring portions 14 to force the respective threaded portions to press them up from the base. The nut body is housed in the cap in the manner that the threaded portions are adjacent to a flange 10 of the cap 3 and the base is adjacent to an opening of the cap. Both the nut body and the cap connected to the nut body can be axially moved to each other between a pressing position that the spring portions keep the tapered surfaces of the threaded portions in contact with a tapered surface of the cap to reduce the inner diameter of the screw formed by the threaded portions and a pulling-out position that the tapered surfaces of the threaded portions are away from the tapered surface of the cap to restore the inner diameter of the screw to a large diameter. The nut body can be axially moved with respect to the cap by means of the cover 6 held in hand.

8 Claims, 8 Drawing Sheets

PRESS NUT

FIELD OF THE INVENTION

The present invention relates to a press nut to engage with threads of a bolt when it is pressed onto the bolt so as to receive the bolt in an inserting hole thereof.

BACKGROUND

A press nut to engage with threads of a bolt when it is pressed onto the bolt so as to receive the bolt in its inserting hole is disclosed, for example, in Japanese Patent Publication No. 6-81830. The press nut described in this publication has an outer shell in a nut-like external form having a tapered inner wall whose inner diameter is gradually reduced toward an opening on an end, a plurality of split nuts which have tapered outer surfaces along the tapered inner wall of the shell and are formed with the threaded grooves on their center side inner walls, and coil springs to push up the split nuts to the tapered inner wall of the shell. As this press nut engages with threads of the bolt when it is pressed onto the bolt so as to receive the bolt in its inserting hole, strongly pressing the nut on the bolt moves the nut directly to a clamping position and so it does not require operation to rotate it to the clamping position, which is necessary for prior nuts. A press nut that is similar to the one described in the above publication is shown in FIGS. 7 and 8 and related description of Japanese Patent Publication No. 6-147214. It does not need rotating operation either.

PROBLEMS TO BE SOLVED BY THE INVENTION

Both of the press nuts described in the above publications require time and labor in their assembly. A plurality of split nuts have to be housed in the hollow portion of the shell in a nut-like external form and coil springs to push up the split nuts have to be set from the rear side of the split nuts. These processes require time. The assembly also requires skill since the coil springs tend to slip out due to their resilience, and the lid of the nut of Japanese Patent Publication No. 6-147214 is apt to come off. Besides, like the conventional press nuts, this press nut is made of metal and when much vibrated, it is feared that the split nuts hit each other to produce noises or cause damage to each other. The manufacture also requires time and money.

In order to solve these problems, the inventor of the present application has developed a press nut which requires neither time nor skill, causes neither noise nor damage even in a place exposed to vibration, is manufactured easily and is fastened firmly by pressing for temporary fixing and rotating slightly ( See Japanese Patent Application No. 9-7551). This press nut still has room for improvement in removal operation, though. In the same way as ordinary nuts, the above press nut has to be rotated through the length of the bolt by using a tool when it is removed. This requires time and labor and it is quite troublesome when there are a plurality of mounting positions.

Accordingly, the present invention aims to provide a press nut which causes neither noise nor damage even in a place exposed to vibration, can be manufactured easily, and is capable of facilitating its removal operation.

SUMMARY OF THE INVENTION

In order to overcome the above-described problems, according to the present invention, there is provided a press nut to engage with threads of a bolt when pressed onto the bolt so as to receive the bolt in an inserting hole thereof; characterized in that the press nut comprises a nut body of plastic, and a tubular cap of plastic to receive the nut body thereinto to connect the nut body thereto; the cap comprising a tubular portion to receive the nut body, with one end of the cap formed as an opening to receive the nut body while the other end has an end plate formed with a small hole to be penetrated by the bolt; the nut body comprising a base, at least two threaded portions formed with threaded grooves on inner walls thereof to form a nut as a whole, and spring portions extending from the base to be connected to the respective threaded portions for forcing the threaded portions to be pressed up from the base; the nut body housed in the cap in the manner that the threaded portions are adjacent to the end plate of the cap and the base is adjacent to the opening of the cap, the threaded portions having outer surfaces tapered to be reduced in diameter toward the bolt inserting hole of the end plate of the cap, the tubular portion of the cap having an inner surface tapered to be reduced in diameter towards the end plate correspondingly to the tapered surfaces of the threaded portions; both the nut body and the cap connected to the nut body being axially movable with respect to each other between a pressing position that the spring portions keep the tapered surfaces of the threaded portions in contact with the tapered surface of the cap to reduce the inner diameter of a screw formed by the threaded portions and a pulling-out position that the tapered surfaces of the threaded portions are away from the tapered surface of the cap to restore the inner diameter of the screw to a larger diameter; the press nut further comprises means to cause axial movement of either the nut body or the cap relative to the other.

As described above, the press nut of the present invention retains the advantage of requiring no rotating operation as it moves to the fastening position simply when it is pressed strongly to receive the bolt in its inserting hole by means of the tapered surface of the cap and the tapered surfaces of the threaded portions, gets rid of the drawbacks of producing noise and causing damage in a place exposed to vibration. Mass production of both the component parts is allowed at very low costs, and they can be assembled easily by pressing the nut body into the cap and require no such coil springs as provided in conventional press nuts. Therefore, the spring portions never come off and there is no need of skill in assembling. When the nut pressed to the fastening position is rotated in a half or full turn, the fastening is tightened. In removing, the nut is rotated inversely in a half or a full turn to release the tight fastening. Then, the nut body is pulled out to the pulling-out position relatively to the cap by using the means to move it axially, and the reduced inner diameter of the screw formed by the two threaded portions expands to a larger diameter to loosen the engagement between the threaded portions and the threads of the bolt, allowing the press nut to be directly detached from the bolt. Thus, its removal is accomplished easily by drawing without requiring any troublesome rotating operation. In case it is not intended to draw out to the nut, loosened engagement, i.e., the state of release may be maintained. This means a plurality of mounting positions are kept in the state of release to make the removal of all of the nuts accomplished even more easily.

It is possible to form the means to cause axial movement in the nut of this invention as a tubular cover of plastic to encircle the cap from the outside and to connect the cover to the coupling portion formed in the base of the nut body so that the nut body can move between the pressing position and the pulling-out position relatively to the cap when the cover is moved axially. The above arrangement allows the nut to be composed of three plastic parts of the nut body, the cap and the cover, thereby saving manufacturing costs and facilitating the assembly.

As a further feature of this invention, by rotating the cover connected to the nut body unrotatable with respect to the nut body, the nut body is rotated so that the threaded portions of the nut body can be fastened firmly to the threads of the bolt. When the cover is rotated inversely, the threaded portions of the nut body can be loosened from their fastening to the bolt threads. The cover may be made non-circle cylindrical in external form to be rotated with fingers or by the use of a tool. It is possible to form a pair of engagement means in the base of the nut body and to form in the cap a pair of engagement means to engage with the above-mentioned engagement means so that the engagement means of the nut body are allowed to engage with the engagement means of the cap in the pulling-out position to maintain the connection between the nut body and the cap whereas the engagement means of the nut body and the engagement means of the cap are not allowed to engage in the pressing position. It is also possible to form the base of the nut body as a plate member having a larger diameter than the cap to restrict the pressing of the nut body into the cap, and to form raised portions in the base into frictional engagement with the inner surface of the end of the opening of the cap to maintain the position of the nut body pressed in. Threaded portions and spring portions can be formed as pairs respectively. It is further possible to arrange the threaded portion oppositely to each other with predetermined spaces therebetween and to form a pair of guide rods extending through the spaces between the threaded portions for guiding the threads of the bolt to engage properly with screw formed by the threaded portions.

BRIEF DESCRIPTION OF ACCOMPANYING DRAWINGS

FIGS. 1 shows a press nut of the present invention; (A) is a perspective view of the nut before assembly, and (B) is a perspective view after assembled.

FIGS. 2 shows the nut body of the press nut of FIGS. 1; (A) is a plan view of the nut body, (B) a front view of it, (C) a bottom view of it, (D) a plan view of threaded portions and (E) a right side view of the nut body.

FIGS. 3 shows the cap of the press nut of FIG. 1; (A) is a plan view of the cap, (B) a sectional view taken along the line A—A of (A), (C) a bottom view of the cap, (D) a sectional view taken along the line B—B of (B), and (E) is a sectional view of it taken along the line C—C of (D).

FIGS. 4 shows the cover of the press nut of FIGS. 1; (A) is a plan view of the cover, (B) a front view, (C) a bottom view and (D) a right side view.

FIGS. 6 (A) and (B) are sketches showing processes of pressing operation in attaching two members.

FIGS. 7 are sketches explaining step by step the attachment procedure by the use of the press nut of the present invention; (A) being a sectional front view of the nut, and (B) a sectional left side view of it.

FIGS. 8 are sketches explaining step by step the removal procedure of the press nut of the present invention; (A) being a sectional front view of the nut, and (B) a sectional left side view of it.

DESCRIPTION OF THE INVENTION

Figure 1A:
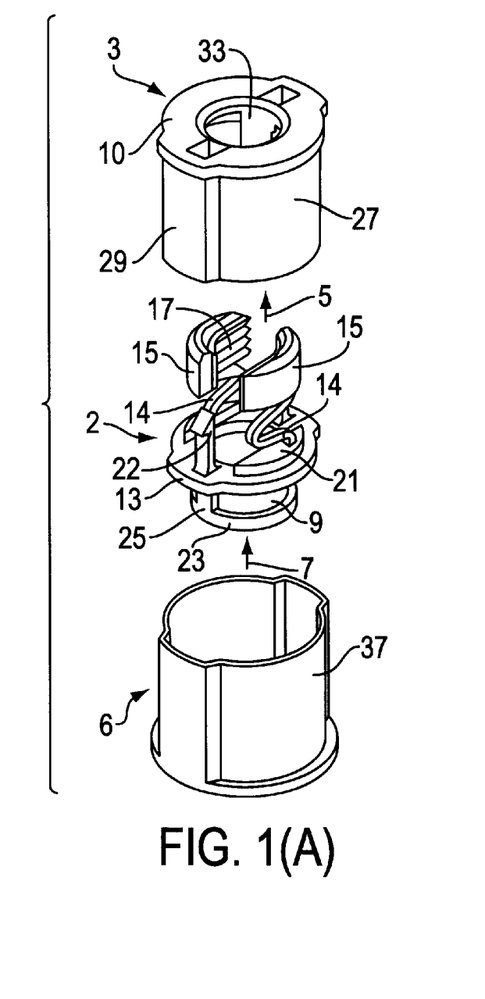
Figure 1B:
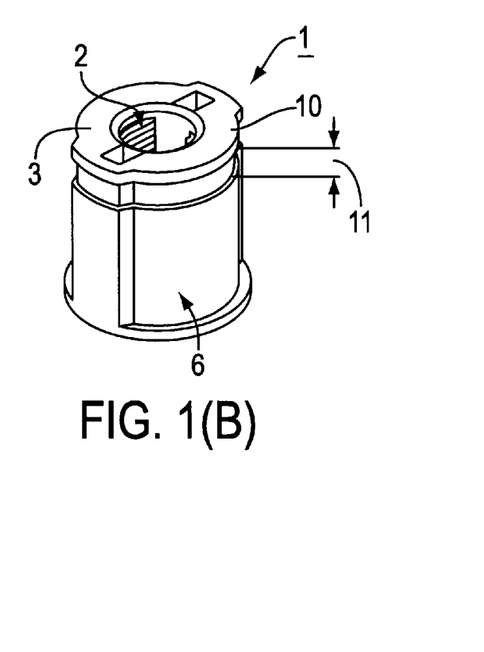

The present invention is described further by way of embodiments, with reference to accompanying drawings. As shown in FIG. 1 (A), a press nut 1 of the present invention has a nut body 2 of plastic, and a tubular cap 3 of plastic to house the nut body 2 therein. The nut body 2 is housed in the cap 3 as indicated by an arrow 5 in FIG. 1 and the cap 3 is connected with the nut body 2 housed therein. The press nut 1 also has a tubular cover 6 of plastic to encircle the cap from the outside. The cover 6 houses the cap 3 and the nut body 2 housed in the cap, and in this state, it is connected to a coupling portion 9 in a lower portion of the nut body 2. As illustrated in FIG. 1 (B), the press nut 1 comprises an assembly of three component parts, i.e., the nut body 2, the cap 3 to be connected to the nut body 2 housed therein, and the cover 6 to house the nut body 2 and the cap 3, which are joined into one body. In the manner that the cover further encircles the cap 3.

The cover 6 is fixedly connected to the nut body 2 axially unmovable with respect to the nut body and axially unrotatable. Although the nut body 2 and the cap 3 are connected together axially unrotatable, their connection allows them to move axially with respect to each other between a pressing position in which the inner diameter of a screw of the nut body 2 is reduced and a pulling-out position in which the inner diameter of the screw of the nut body 2 is released to a larger diameter. The cover 6 allows both the nut body 2 and the cap 3 to move them to each other between the pressing position and the pulling-out position. When the cover 6 is moved axially (vertically in FIG. (A)), the nut body 2 axially moves with respect to the cap 3 between the pressing position and the pulling-out position. In the position shown in FIG. 1 (B) indicating that they are in the pulling-out position, a space 11 is formed between an end plate 10 on the top of the cap 2 and the upper end of the cover 6. When the cover 6 is pushed up axially to get rid of the space, they take the pressing position. In the following, the structures of the nut body 2, the cap 3 and the cover 6 are described in detail.

First, the nut body 2 is described with reference to FIGS. 2 (A) through (E). In FIGS. 2, (A) is a plan view of the nut body, (B) its front view, (C) its bottom view, (D) a plan view of threaded portions and (E) a left side view of the nut body. The nut body 2 comprises a base 13 in a lower portion, two spring portions 14 extending upwardly from the base 13, which are formed as leaf springs made from narrow strip-like members, and two threaded portions 15 molded integrated on the respective upper ends of the spring portions 14. The spring portions 14 are provided respectively for the threaded portions, serving to connect the threaded portions 15 to the base 13. The inner walls of the threaded portions 15 are formed with threaded grooves 17 for engagement with threads of a bolt. To form a nut portion as a whole, the two threaded portions 15, 15 faces each other diametrically with space therebetween, and a space for the insertion of the bolt is defined in the their center. The number of the threaded portions 15 is not limited to two; three to more of them may be provided. In such a case, one spring portion is formed for each threaded portion and is molded as a unit with a threaded portion. The base 13 is formed with a coupling portion 9 projecting downwardly for connecting the cover 6.

Figure 2A:
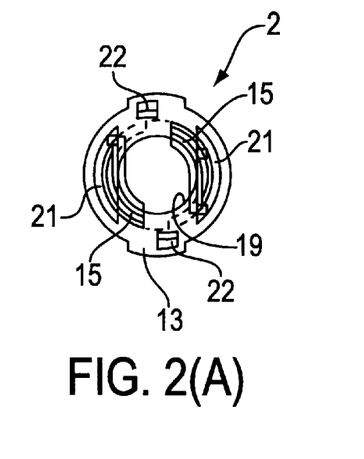
Figure 2B:
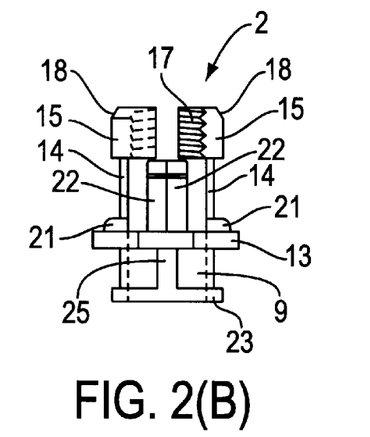
Figure 2C:
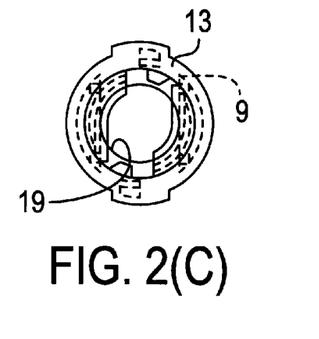
Figure 2D:
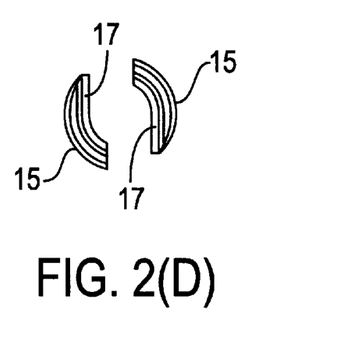
Figure 2E:
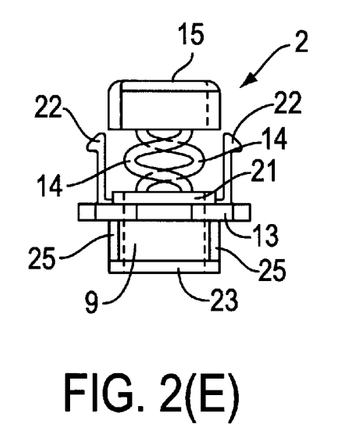

Each spring portion 14 forces the corresponding threaded portion 15 to press it up from the base 13. Accordingly, when a force is applied to the threaded portions 15 from above in the unloaded (natural) condition shown in FIGS. 2(B) and (E), the threaded portions 15 are pressed down due to bending of the spring portions 14. Upon releasing the pressing force, the spring portions 15 return to the unloaded condition as illustrated. The periphery of an upper portion of each threaded portion 15 is formed to have a tapered surface 18 the diameter of which is reduced gradually upwardly. In the center of the base 13, a bolt inserting hole 19 is formed in a position corresponding to the bolt insertion space defined by the threaded portions 15.

The base 13 comprises a plate member having a larger diameter than the inner diameter of a lower tubular portion of the cap 3 for preventing the nut body 2 from being pressed into the cap 3 excessively. The base 13 is made in a form matching with a lower portion of the cap 3. In the embodiment, the tubular portion of the cap 3 is non-circle cylindrical in form, that is, a cylinder projected radially outwardly in two diametrically opposed positions. This allows the cap 3 to be rotated with fingers or by the use of a tool and prevents it from rotating together with the rotation of the bolt. Therefore, the base 13 is formed as a disc having radially outwardly protruded portions in two diametrically opposed positions. The upper surface of the base is formed with a pair of raised portions 21 protruding upwardly to ensure correct positioning of the lower portion of the cap 3 to the base 13. Further, these raised portions 21 frictionally engage with the inner surface of the end of the opening of the tubular portion of the cap in the pressing position in which the nut body 2 is pressed in the cap, thus functioning to maintain the pressing position. On the upper surface of the base 13, a pair of diametrically opposed engagement pawls 22, 22 are formed.

To connect the cover 6, the base 13 is formed with the coupling portion 9 extending downwardly. The coupling portion 9 is in a cylindrical form having an inserting hole 19 to guide and restrict the axis of the bolt to the center of the base. On the lower end of the coupling portion 9, a flange 23 is formed. The lower ends of the engagement portions of the cover 6 engage with the flange 23 to connect the cover 6 to the nut body 2. On the outer surface of the coupling portion 9, ribs 25 extending vertically are formed in diametrically opposed positions. The ribs 25, which engage with the engagement portions of the cover 6, connect the nut body 2 to the cover 6 in the manner that they do not rotate relatively to each other. The cover 6 is connected to the nut body 2 by means of the coupling portion 9 and so, when the cover 6 is moved axially, the nut body 2 moves axially. Likewise, when the cover 6 is rotated, the nut body 2 rotates.

The cap 3 is described with reference to FIGS. 3(A) through (E). In FIG. (A) is a plan view of the cap, (B) a sectional view taken along the line A—A of (A), (C) a bottom view of the cap, (D) a sectional view taken along the line B—B of (B), and (E) a sectional view taken along the line C—C of (D). The cap 3 comprises a circular end plate 10 on the top, and tubular portion 27 extending downwardly from the end plate 10. Since the end plate 10 projects from the tubular portion 27 and is formed as a flange, it is referred to as the flange 10 in the following. The flange 10 serves as a contact surface with an attachment member, and also serves the user as a mark for the direction in which the press nut 1 is attached to a bolt. The tubular portion 27 is non-circle cylindrical in form, that is, it is a cylinder having radially outwardly projected portions 29 extending longitudinally in two diametrically opposed positions. This non-circle cylindrical form allows the cap 3 to be rotated with fingers or by the use of a tool and prevents it from rotating together with a rotating bolt. The form of the tubular portion 27 of the cap 3 is not limited to what is described above but it may be in any non-circle cylindrical form including a hexagonal cylinder, some other polygonal cylinder or an elliptic cylinder as long as it does not rotate together when a bolt is rotated. In the center of the flange 10, a bolt inserting hole 30 to be penetrated by a bolt is formed. The lower end of the tubular portion 27 is open and the opening is large enough to receive and house the nut body 2 easily.

Figure 3A:
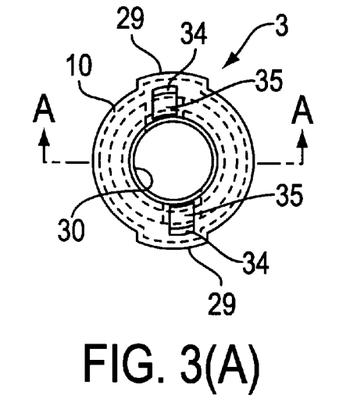
Figure 3B:
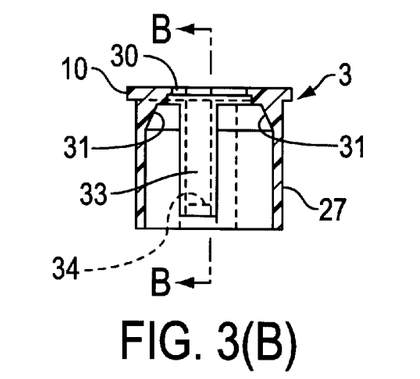

The tubular portion 27 has, in its portion close to the flange 10, a tapered surface 31 toward the bolt inserting hole 30 of the flange 10 and so the inner diameter of the tubular portion 27 gradually decreases. The tapered surface 31 is formed correspondingly to the tapered surface 18 of the threaded portions 15. When the nut body 2 is pressed, the threaded portions 15 are pressed upward by the spring portions 14, and the tapered surfaces 18 of the threaded portions 15 ascend while in contact with the tapered surface 31 of the tubular portion. The tapered surface 31 works to move the two threaded portions 15 gradually inwardly and the inner diameter of a female screw formed by the two threaded portions 15 is reduced. In the tubular portion 27, the inner diameter of a portion below the tapered surface 31 is formed to be large enough to allow the bolt insertion space inside the two threaded portions 15 to be slightly larger than the outer diameter of the bolt. Accordingly, when the threaded portions 15 are pressed down, the threaded portions 15 which move downward owing to the resilience of the spring portion 14 can descend below the tapered surface 31. As they are descending, the two threaded portions 15 get away from each other to make the bolt insertion space between them larger, weakening the engagement force with threads of the bolt. When the threaded portions 15, 15 are bent to be in surface-contact with the inner wall of the tubular portion 27, the bolt insertion space become larger than the outer diameter of the bolt threads. Thus, the press nut of the present invention so capable of moving to its fastening position simply when pressed onto the bolt, requiring no rotation. It is capable of being drawn out from the fastening position in the direction of its removal, rotation not required either. Upon discontinuing the pressing of the nut 1 in the fastening position, the pressing force on the threaded portions 15 is lost and the threaded portions 15 are pressed upward by the resilience of the spring portions 14. Then the tapered surfaces 18 and 31 function to bring the two threaded portions 15 inward and they engage with the male screw of the bolt firmly. When, in this state, the cap 3 is turned in a half or full turn, the fastening can be tighten in the same way as in the case of common nuts.

Figure 3C:
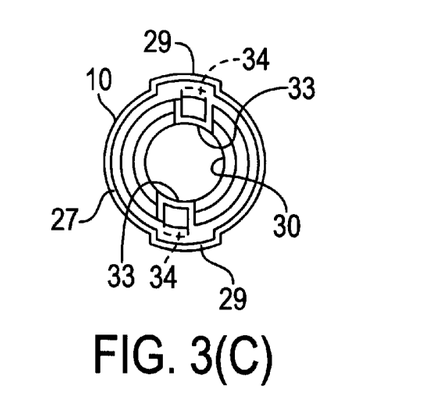
Figure 3D:
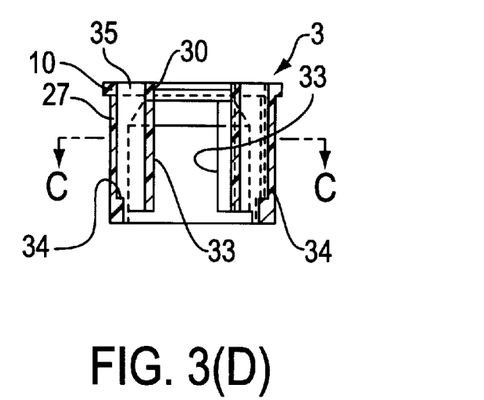
Figure 3E:
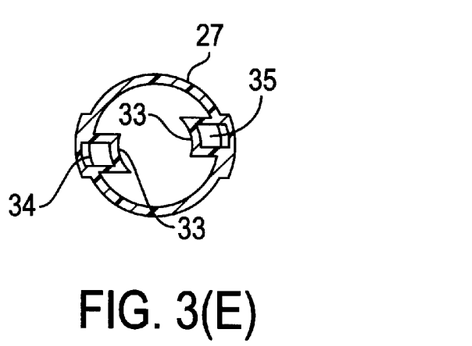
Figure 4A:
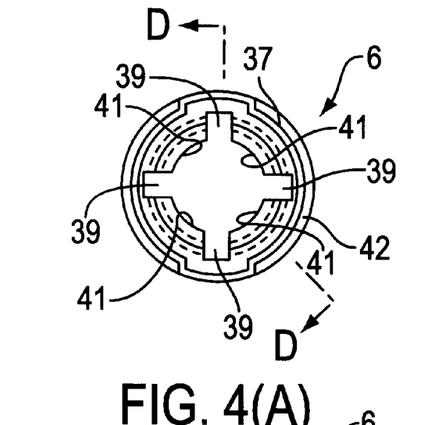
Figure 4B:
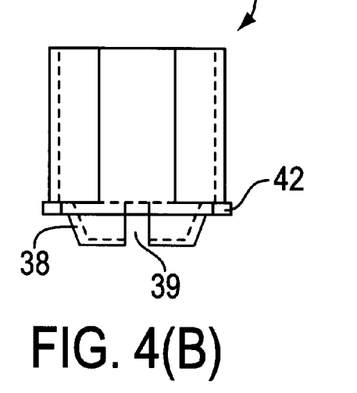
Figure 4C:
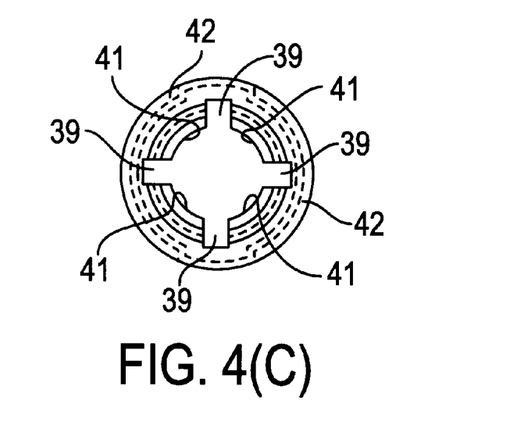
Figure 4D:
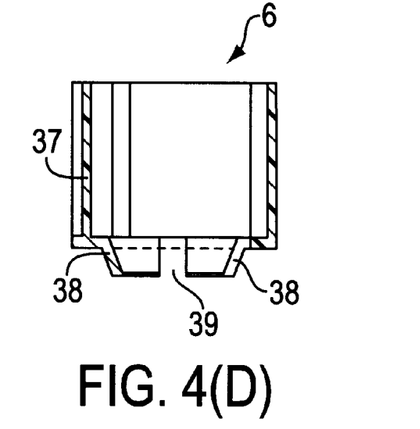

Inside the cap 3, a pair of guide rods 33 opposing diametrically is formed to extend downward from the flange 10. The guide rods 33 are adjacent to the projected portions 29. The guide rods 33 are so positioned that they pass through the spaces between the threaded portions 15 of the nut body 2. As second stoppers to keep the cap 3 and the nut body 2 in the pressing position, the guide rods 33 are long enough to reach the position in which they abut on the raised portions 21 of the base 13 of the nut body 2 in the pressing position. Filling the spaces between the threaded portion 15 of the nut body 2, the guide rods 33 function to guide and restrict the bolt so that the axis of the bolt passing through the bolt insertion space between the threaded portions 15 can coincide with the axes of the bolt inserting holes 19 and 30 to ensure the engagement between the threaded grooves 17 of the threaded portions 15 and the threads of the bolt.

Since the guide rods 33 are in the spaces between the threaded portions 15, they can prevent the threaded portion 15 from unnecessary reduction in diameter while the tapered surfaces 18 and 31 are functioning to reduce the diameter of the space defined by the threaded portions, thereby preventing the bolt inserting hole formed by the two threaded portions 15 from becoming too small to allow the insertion of the bolt. Moreover, because the guide rods 33 are adjacent to the threaded portions 15, when the cap 3 is rotated to move the guide rods in the direction of its rotation, their rotating force is transmitted to the threaded portions 15 to move them together with them, and the cap 3 is prevented from rotating alone (i.e., lost motion is prevented).

In a lower end portion of the cap 3, a pair of engagement portions 34 to engage with the engagement pawls 22 formed in the base 13 of the nut body 2 is formed correspondingly to the engagement pawls 22. In the embodiment, the engagement portions 34 are formed by making use of the guide rods 33. A hole 35 for molding goes through the center of each of the guide rods 33, and forms an engagement portion 34 by defining a shoulder for engagement in a lower end portion of the tubular portion 27. The engagement portions 34 and the engagement pawls 22 are used to maintain the connection when the nut body 2 and the cap 3 are in the pulling-out position. When the nut body 2 and the cap 3 are in the pressing position, the engagement pawls 22 of the nut body 2 and the engagement portion 34 are not in engagement with each other. In the pressing position, the base 13 abuts on the lower end of the tubular portion 27 and the raised portions 21 of the base is in frictional engagement with the inner wall of the end of the tubular portion 27 to maintain the pressing position. Since the engagement portions 34 are formed in the hollow portions of the guide rods 33, in connecting the cap 3 with the nut body 2, the engagement pawls 22 can be positioned to the engagement portions 34 in the hollow portions of the guide rods 33 by aiming at the projected portions 29, and the connection is accomplished by just pressing the engagement pawls in.

The cover 6 is described with reference to FIGS. 4 (A) through (D). In FIGS. 4, (A) is a plan view of the cover, (B) a front view, (C) a bottom view and (D) a sectional view taken along the line D—D of (A). As shown in FIG. 1 (B), the cover 6 comprises a tubular portion 37 to encircle the cap 3 entirely from the outside and a coupling portion 38 formed in a lower portion of the tubular portion 37 for connection with the coupling portion 9 of the base 13 of the nut body 2. To match with the form of the tubular portion 27 of the cap 3, the tubular portion 37 is formed to be non-circle cylindrical in form, having two radially outwardly projected portions extending longitudinally, and encircles the tubular portion 27 of the cap completely from the outside so as to be unrotatable with respect to the cap but movable axially. To match with the coupling portion 9 of the base 13 of the nut body 2, the coupling portion 38 is formed like an inverted truncated cone and divided to four by four slits 39. The bottom of the coupling portion is formed with engagement portions 41 to engage with the flange 23 of the coupling portion 9 of the base, and they connect the cover 6 to the nut body 2 axially unmovable. When these are connected, the ribs 25 of the coupling portion 9 of the base are received in the slits 39 to prevent the cover 6 from rotating with respect to the nut body 2. Between the tubular portion 37 and the coupling portion 38, a flange 42, which functions as a finger hold when the cover 6 is pressed or drawn out, is formed.

The cover 6 is the means to axially move the nut body 2 relatively to the cap 3. It is used to axially move the nut body 2 connected to the cap with respect to the cap 3, between the pressing position that reduces the inner diameter of the screw formed by the two threaded portions 15, 15 and the pulling-out position that releases the inner diameter of the screw to a larger diameter. The operator takes up the tubular portion 37 with fingers, and presses or draws it out with fingers held by the flange 42, and rotates the cover by holding the tubular portion 37 provided with projected portions. It is possible to move the cover axially or rotate it round the axis by using a special tool in place of fingers, needless to say.

Figure 5:
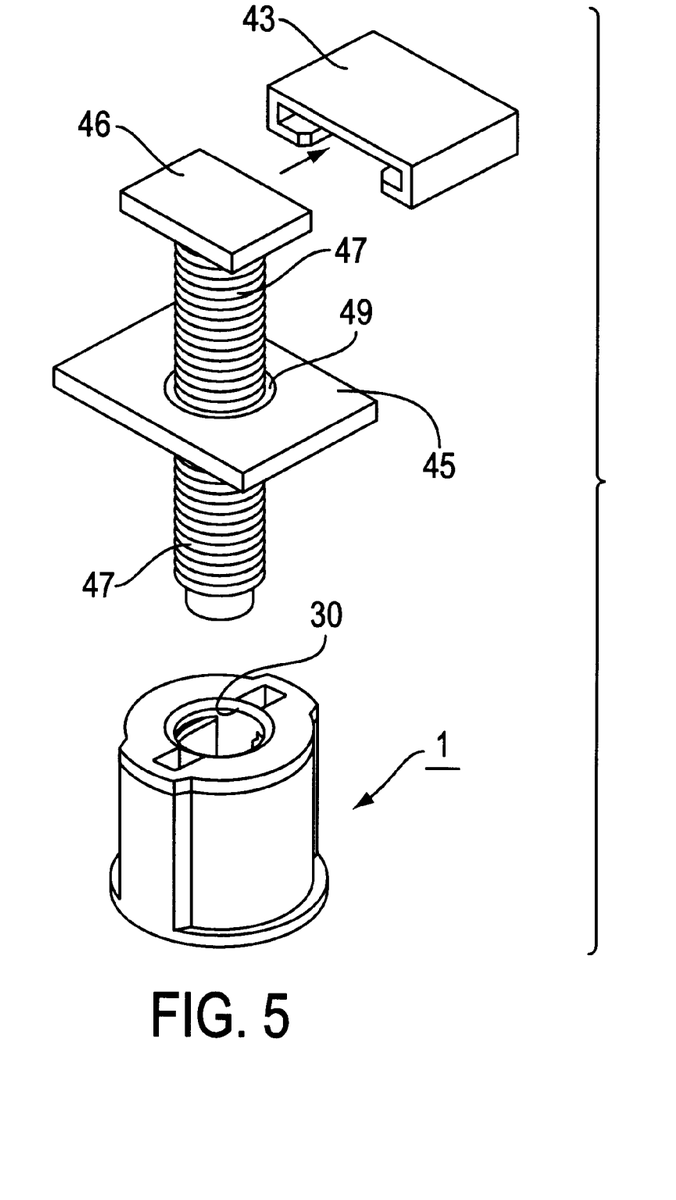
FIGS. 5 is a sketch showing a preparatory stage of attaching two members by using the press nut of the present invention.
Figure 6A:
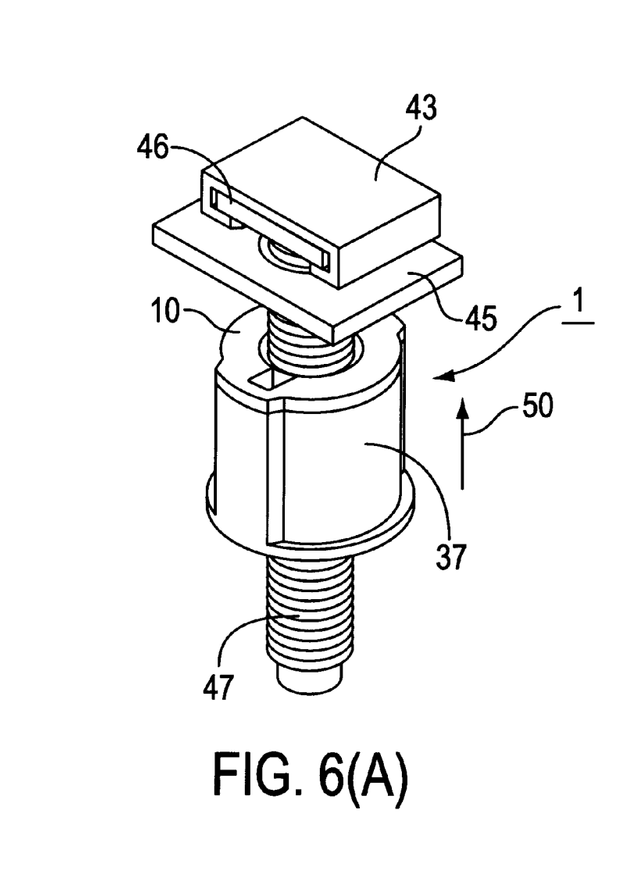
Figure 6B:
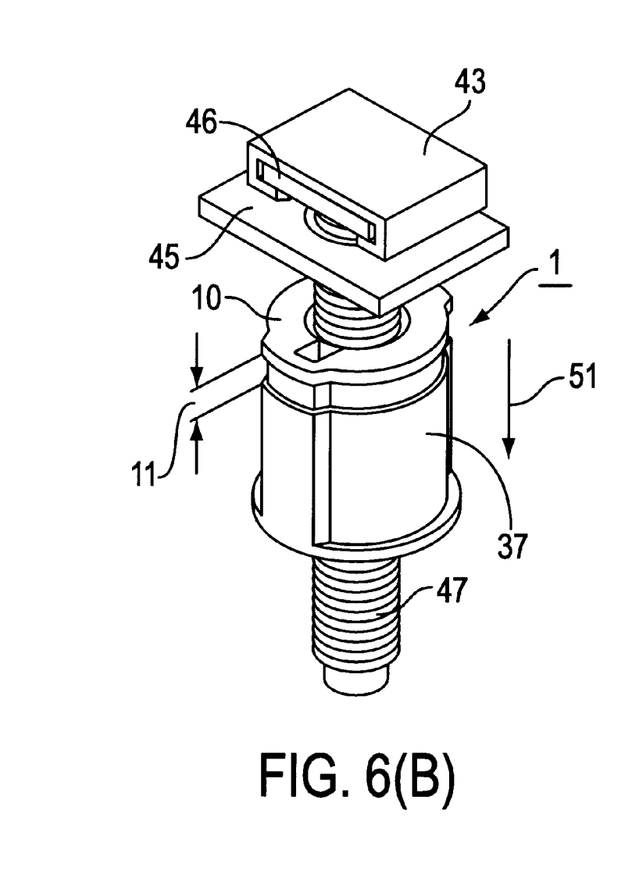

How to attach a member to another by the use of the press nut 1 of the above-stated structure is described in the following, with reference to FIGS. 5 through 8. To attached a first member 43 to a second member 45, a bolt 47 having a head 46 and the press nut 1 of the present invention are used. With reference to FIGS. 5 and 6, attaching and detaching operations are outlined. In FIG. 5, the first member 43 is attached to the bolt head 46. The bolt 47 is inserted into a mounting hole 49 of the second member 45. The press nut 1 of the present invention is pressed onto a portion of the bolt 47 extending out of the mounting hole 49 to receive the bolt 47 in the bolt inserting hole 30. In FIG. 6(A), the press nut 1 is pressed as indicated by an arrow 50. When pressed, the nut body and the cap are in the pressing position, and no space is formed between the flange (end plate) 10 on the top of the cap 3 and the upper end of the tubular portion 37 of the cover. To remove the press nut 1 thus pressed, in FIG. 6(B), the tubular portion 37 of the cover is held by fingers and drawn out as indicated by an arrow 51. When drawn, the nut body and the cap are in the pulling-out position, and the space 11 is formed between the flange 10 on the top of the cap 3 and the upper end of the tubular portion 37 of the cover.

Figure 7A:
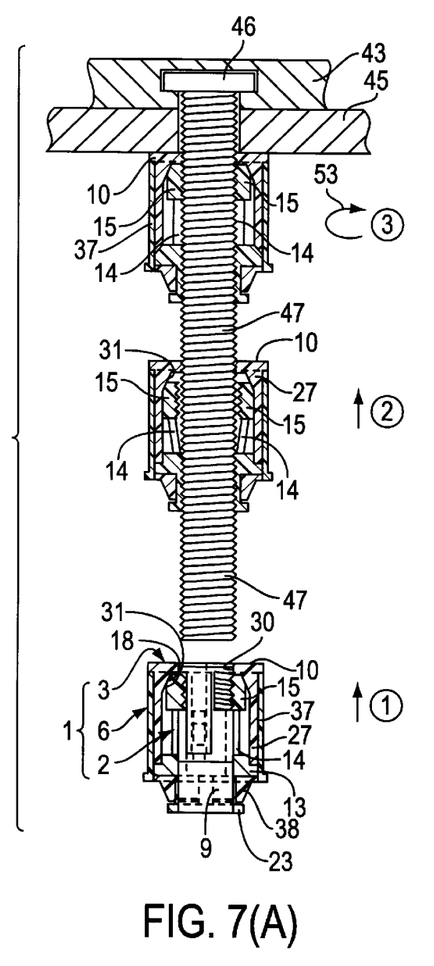
Figure 7B:
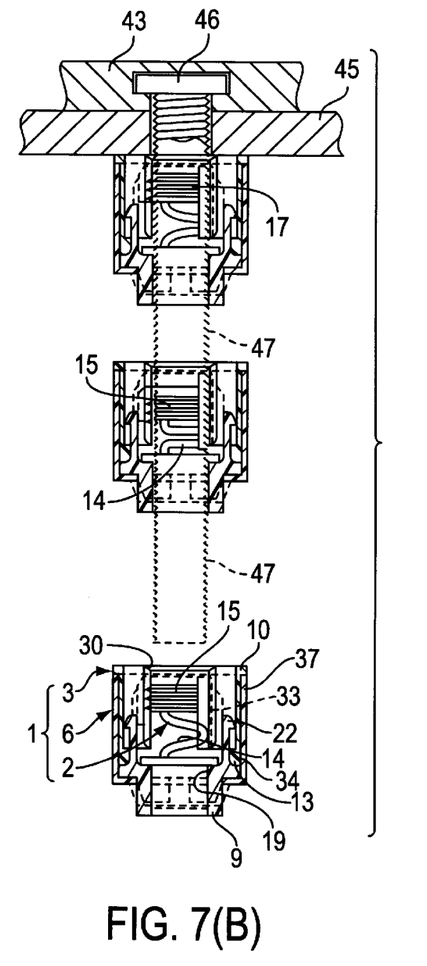

Now, the mounting procedure is described in three steps, referring to FIGS. 7 (A) and (B). In the respective steps (1), (2) and (3) in FIGS. 7, (A) are sectional front views of the press nut 1 and (B) are sectional left side views of the nut 1. In step (1) the press nut 1 is held with fingers or by using a tool, and is put on the bolt, the flange 10 as an end plate of the cap 3 first, by positioning the bolt inserting hole 30 to the end of the bolt 47 extending from the second member 47. The press nut 1 has no space between the flange 10 of the cap 2 and the tubular portion 37 of the cover 6, i.e., it is in the pressing position in which the nut body 2 is pressed in the cap 3. Therefore, the threaded portions 15 are forced up by the spring portions 14, and the inner diameter of the nut screw formed by the two threaded portions 15, 15 is made smaller by means of the tapered surfaces 18 of the threaded portions and the tapered surface 31 of the tubular portion.

Next, the press nut 1 is pressed up so that the end of the bolt 47 gets in the bolt inserting hole 30. By this pressing, the end of the bolt is brought into contact with the upper ends of the threaded portions 15, and in this state, upper portions of the threaded portions 15 are forced down. As shown in Step (2), owing to the resilience of the springs 14, the threaded portions 15 can descend along the inner wall of the tubular portion 37 of the cap. As they are moving down, the two threaded portion 15 get away from each other to allow the inner diameter of the nut portion formed by the threaded portions to become larger than the outer diameter of the threads of the bolt 47. When the press nut 1 is pressed upward, the threads of the bolt 47 slightly engage with the screw formed by the threaded portions. Since the two threaded portions 15 can get away from each other to have a larger inner diameter than the outer diameter of the threads of the bolt, however, it does not interfere with the pressing of the nut 1. When pressed up further, the press nut 1 can be moved along the bolt 47 up to the clamping position shown in Step (3), requiring no rotation. For instance, in case the bolt 47 is long as illustrated, a nut that has to be rotated like conventional ones takes time and requires troublesome work. On the other hand, only linear movement suffices for the press nut 1 of the present invention and so work is accomplished easily in a short time. Since the spaces between the threaded portions are filled by the guide rods of the cap 3, the ax of the press nut 1 can move while maintaining a proper posture to the axis the bolt 47.

In Step (3), in the clamping position in which the flange 10 of the cap is in surface-contact with the lower surface of the second member 45, the press nut 1 is forced to abut on the second member 45. As the movement of the nut 1 stops, the pressing force from the bolt 47 to the threaded portions 15 is lost. Owing to the resilience of the spring portions 14, the threaded portions 15 ascend along the inner wall of the tubular portion 27 of the cap. In ascending, the two threaded portions 15, 15 are moved inward by means of the tapered surfaces of the threaded portions and the tapered surface of the tubular portion to reduce the inner diameter of the nut portion formed by the threaded portions and the threaded grooves 17 engage with the male screw of the bolt 47. By this engagement, the first member 43 is fastened to the second member 45 with a predetermined strength. This fastening can become more complete when the nut 1 is rotated as indicated by an arrow 53 in the clamping position. To rotate the nut in a half or full turn, with the tubular portion 37 of the cover held with fingers, is enough to attain as strong clamping as in the case of an ordinary nut. Accordingly, the press nut 1 attains firm fastening, virtually requiring no rotation.

Figures 8A, 8B:
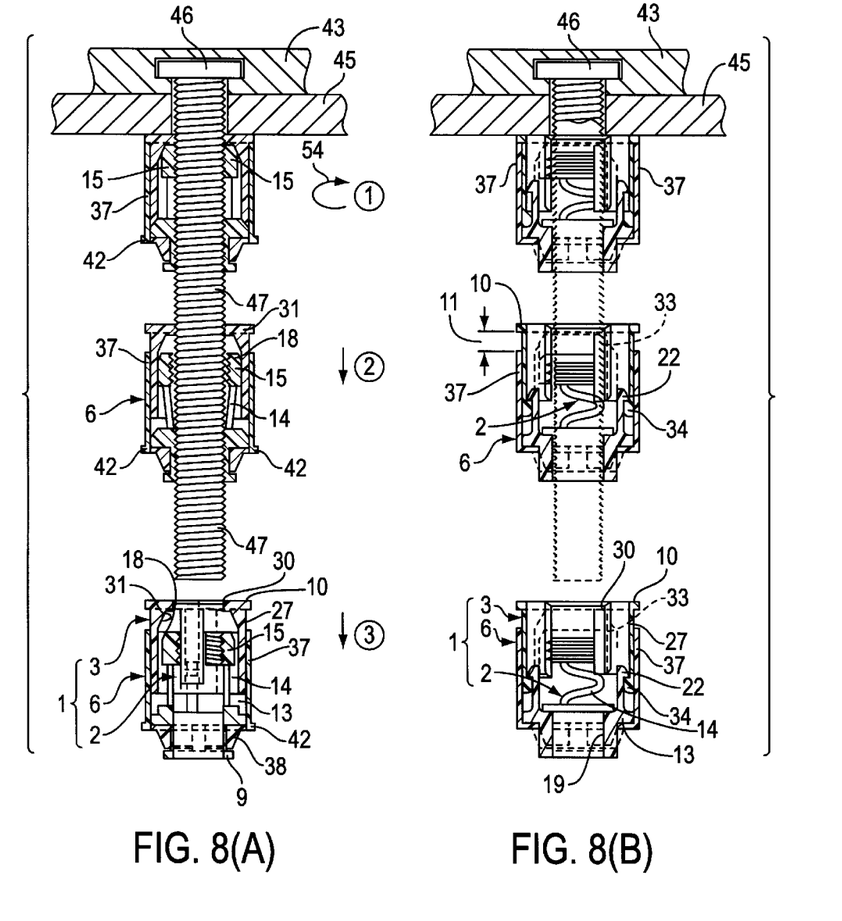

The removal procedure is described in three steps, referring to FIGS. 8 (A) and (B). In the respective steps (1), (2) and (3) of FIGS. 8, (A) are sectional front views of the press nut 1 and (B) are sectional left side views of the nut 1. In Step (1), the tubular portions 37 of the cover 6 of the press nut 1 is held with fingers or by using a tool, and its fastening through the screw-engagement between the threaded portions 15 and the bolt 47 is loosened by rotating the nut, as indicated by an arrow 54, slightly more than when fastened. Then, while the tubular portion 37 of the cover is continuously held, the tubular portion 37 is moved downward so as to be drawn out.

Step (2) of FIGS. 8 shows the state of the tubular portion 37 of the cover 6 in the process of being moved downward so as to be drawn out. When fastening of the nut 1 through the screw-engagement between the threaded portions 15 and the bolt 47 is loosened, the threaded portions 15 are allowed to be out of mesh with the threads of the bolt. In this condition, by drawing out the tubular portion 37 of the cover 6, the nut body 2 connected to the coupling portion 38 of the cover through the coupling portion 9 is drawn downward at the same time as the drawing out of the cover 6 since the threaded portions 15 have been released from the screw engagement with the bolt 47. In the beginning of the drawing, the threaded portions 15 may be still slightly in screw-engagement with the bolt 47 but the cover 6 can be drawn out strongly by using the flange 42 on the lower end side of the tubular portion 37 of the cover 6. When the nut body 2 is taken out of the cap 3 by drawing out the cover 6, the tapered surfaces 18 of the threaded portions get away from the tapered surface 31 of the inner wall of the tubular portion 27 of the cap, and the reduced inner diameter of the nut portion formed by the two threaded portions is released to a larger diameter than the outer diameter of the threads of the bolt 47. Drawing out the nut body 2 from the cap 3 is stopped when the engagement pawls 22 of the nut body 2 engage with the engagement portions 34 of the cap 3. This position is the pulling-out position, in which the space 11 is formed between the flange 10 of the cap and the upper end of the tubular portion 37 of the cover. In the pulling-out position, the threads of the bolt 47 are slightly in engagement with the screw formed by the threaded portions 15. Nevertheless, as the two threaded portions 15 can get away from each other to have a larger inner diameter than the outer diameter of the threads of the bolt, when the cover 6 is drawn downward, the nut body 2 and the cap 3 directly move down together.

In step (3) of FIGS. 8, by continuing the drawing operation of the cover 6, the press nut 1 can be detached from the bolt 47. The removal of the nut 1 allows the first member 43, together with the bolt 47, to be detached from the second member 45. As stated above, in detaching the nut 1, after rotating it in a little more than one circle to loosen its fastening, it suffices to move the nut 1 linearly along the bolt from the clamping position of Step (1) to the detaching position of step (3). A nut which needs to be rotated like conventional ones requires more labor and longer time in removal operation as the bolt length increases. Inasmuch as the press nut 1 of the present invention requires only linear movement, work can be accomplished with ease and in short time.

ADVANTAGEOUS EFFECT OF THE INVENTION

According to the press nut of the present invention, while the advantage of requiring no rotating operation is related since the press nut moves linearly to the fastening position simply when it is pressed strongly to receive the bolt in its inserting hole by means of the tapered surface of the cap and the tapered surfaces of the threaded portions, the drawback of producing noise or causing damage in a place exposed to vibration is eliminated and it becomes possible to mass-produce both of the component parts at very low costs. As the press nut can be assembled easily by pressing the nut body into the cap, requiring no such coil springs as provided in conventional press nuts, that is, the spring portions never come off, there is no need of skill in assembling. When the nut pressed in to the fastening position is rotated in a half or full turn the fastening is tightened. In removing, the nut is rotated inversely in a half or full turn to release the tight fastening. Then, the nut body is pulled out to the drawing position relatively to the cap by using the means to move it axially, and the reduced inner diameter of the screw formed by the two threaded portions expands to a larger diameter to loosen the engagement between the threaded portions and the threads of the bolt, allowing the press nut to be immediately detached from the bolt. Thus, its removal is accomplished easily by drawing without requiring troublesome rotating operation. In case it is not intended to draw out the nut, loosened engagement, i.e., the state of release may be maintained. This means a plurality of mounting positions are kept in the state of release to make the removal at all the positions accomplished even more easily.

What is claimed is:

1. A press nut to engage with threads of a bolt when pressed onto the bolt so as to receive the bolt in an inserting hole thereof, said press nut comprising a nut body of plastic, and a tubular cap of plastic to receive said nut body therein said cap comprising a tubular portion to receive said nut body, with one end of the cap formed as an opening to receive said nut body and its other end comprising an end plate having a small hole for receiving a bolt; said nut body comprising a base, at least two threaded portions formed with threaded grooves on inner walls thereof, said portions together forming a cylindrical nut, and spring portions extending from said base,one of said spring portions being connected to a respective one of said threaded portions for biasing said threaded portions away from said base; said nut body being positioned in said cap with said threaded portions adjacent to said end plate of said cap, said threaded portions having outer surfaces tapered to be reduced in diameter toward said end plate end of said cap, said tubular portion of said cap having an inner surface tapered to be reduced in diameter toward said end plate; both said nut body and said cap being axially movable with respect to each other between a pressing position wherein said spring portions keep said tapered surfaces of said threaded portions in contact with said tapered surface of said cap to reduce the inner diameter of said threaded portions and a pulling-out position wherein said tapered surfaces of the threaded portions are away from the tapered surface of the cap to increase the inner diameter of said threaded portions; and the press nut further comprises means to cause axial movement of either the nut body or the cap relative to the other.

2. The nut according to claim 1 wherein said means to cause axial movement comprises a tubular cover of plastic to encircle the cap from the outside, and the cover is connected to a coupling portion formed in the base of the nut body to move the nut body relatively to the cap between the pressing position and the pulling-out position by the axial movement thereof.

3. The nut according to claim 2 wherein the cover is connected to the nut body unrotatable with respect to the nut body, and is capable of rotating the nut body so that the threaded portions of the nut body can be fastened firmly to threads of the bolt by rotation thereof and of loosening the fastening of the threaded portions of the nut body to the threads of the bolt reverse rotation thereof.

4. The nut according to claim 3 wherein the cover has a non-circle cylindrical external form to be rotatable by the use of fingers or a tool.

5. The nut according to claim 1 wherein the base of the nut body is formed with a pair of engagement means while the cap is formed with a pair of engagement means to engage with said engagement means, and although the engagement means of the nut body and the engagement means of the cap are not in engagement in the pressing position, the engagement means of the nut body is in engagement with the engagement means of the cap in the pulling-out position to maintain the connection between the nut body and the cap.

6. The nut according to claim 5 wherein the base of the nut body comprises a plate member of which the diameter is larger than the inner diameter of the cap to restrict pressing into the cap, and the base is formed with raised portions to maintain the pressing position through frictional engagement with the inner surface of the end of the opening of the cap.

7. The nut according to claim 1 wherein the threaded portions and spring portions are formed in pairs, respectively.

8. The nut according to claim 7 wherein the threaded portions face with each other by predetermined spaces therebetween, and the cap is provided with a pair of guide rods to guide the threads of the bolt into proper engagement with the screw formed by the threaded portions with the rods extending through the spaces between the threaded portions.

* * * * *